(12) United States Patent
Murayama

(10) Patent No.: US 11,932,145 B2
(45) Date of Patent: Mar. 19, 2024

(54) CONVEYANCE SEAT AND CONVEYANCE SEAT MANUFACTURING METHOD

(71) Applicant: TS TECH CO., LTD., Asaka (JP)

(72) Inventor: Taro Murayama, Tochigi (JP)

(73) Assignee: TS TECH CO., LTD., Asaka (JP)

(*) Notice: Subject to any disclaimer, the term of this patent is extended or adjusted under 35 U.S.C. 154(b) by 0 days.

(21) Appl. No.: 17/784,925

(22) PCT Filed: Dec. 15, 2020

(86) PCT No.: PCT/JP2020/046714
§ 371 (c)(1),
(2) Date: Jun. 13, 2022

(87) PCT Pub. No.: WO2021/125159
PCT Pub. Date: Jun. 24, 2021

(65) Prior Publication Data
US 2023/0010209 A1    Jan. 12, 2023

(30) Foreign Application Priority Data

Dec. 16, 2019 (JP) ................ 2019-226605

(51) Int. Cl.
*B60N 2/68* (2006.01)
*B60N 2/70* (2006.01)

(52) U.S. Cl.
CPC ............. *B60N 2/68* (2013.01); *B60N 2/7041* (2013.01); *B60N 2/7047* (2013.01)

(58) Field of Classification Search
CPC ...... B60N 2/7047; B60N 2/7041; B60N 2/68; B60N 2/66; B60N 2/667; B60N 2/6671; B60N 2/6673
See application file for complete search history.

(56) References Cited

U.S. PATENT DOCUMENTS

| | | | | |
|---|---|---|---|---|
| 7,677,659 | B2 * | 3/2010 | Humer ................ | B60N 2/6673 297/216.12 |
| 8,011,729 | B2 * | 9/2011 | Petzel .................. | B60N 2/667 297/284.6 |
| 10,889,215 | B1 * | 1/2021 | Mizukoshi ............ | B60N 2/68 |

(Continued)

FOREIGN PATENT DOCUMENTS

| | | | |
|---|---|---|---|
| CN | 104999949 A | * 10/2015 | .......... B60N 2/7041 |
| JP | 2017-081565 | 5/2017 | |

(Continued)

OTHER PUBLICATIONS

PCT International Search Report (w/ English translation) for corresponding PCT Application No. PCT/JP2020/046714, dated Mar. 16, 2021, 4 pages.

*Primary Examiner* — Timothy J Brindley
(74) *Attorney, Agent, or Firm* — Dority & Manning, P.A.

(57) ABSTRACT

Provided is a conveyance seat with which the assemblability of a wire member with respect to a seat frame can be improved. A conveyance seat includes a seat frame. The seat frame has: a pair of side frames arranged in side portions of the conveyance seat; and a cross-linking frame cross-linking the pair of side frames, a wire member is disposed between the pair of side frames, the cross-linking frame has a wire receiving portion receiving the wire member, and the wire member is fastened to the wire receiving portion.

9 Claims, 18 Drawing Sheets

(56) References Cited

U.S. PATENT DOCUMENTS

| | | | |
|---|---|---|---|
| 11,273,743 B1* | 3/2022 | Wilkinson | B60N 2/72 |
| 2004/0155501 A1* | 8/2004 | McMillen | B60N 2/6673 |
| | | | 297/284.4 |
| 2006/0033376 A1* | 2/2006 | Takenaka | B60N 2/888 |
| | | | 297/410 |
| 2010/0187874 A1* | 7/2010 | Matsui | B60N 2/42781 |
| | | | 297/216.12 |
| 2012/0133183 A1* | 5/2012 | Kim | B60N 2/667 |
| | | | 297/284.4 |
| 2013/0341982 A1* | 12/2013 | Maierhofer | B60N 2/666 |
| | | | 297/284.4 |
| 2014/0070583 A1* | 3/2014 | McMillen | B60N 2/66 |
| | | | 297/284.4 |
| 2014/0210240 A1* | 7/2014 | Muck | B60N 2/0232 |
| | | | 297/284.4 |
| 2018/0093598 A1* | 4/2018 | Higashihara | B60N 2/7011 |
| 2018/0342830 A1 | 11/2018 | Mizuno et al. | |
| 2019/0255976 A1 | 8/2019 | Katoh et al. | |
| 2019/0315255 A1* | 10/2019 | Onuma | B60N 2/68 |
| 2020/0361350 A1 | 11/2020 | Hoshi et al. | |
| 2020/0376994 A1 | 12/2020 | Kuroda | A47C 7/40 |
| 2021/0129725 A1* | 5/2021 | Ishizuka | B60R 21/02 |

FOREIGN PATENT DOCUMENTS

| | | | | |
|---|---|---|---|---|
| JP | 2018-090010 | | 6/2018 | |
| JP | 2019-073215 | | 5/2019 | |
| WO | WO-2014024585 A1 * | 2/2014 | | B60N 2/42745 |
| WO | WO-2021065526 A1 * | 4/2021 | | B60N 2/90 |

* cited by examiner

FIG. 4
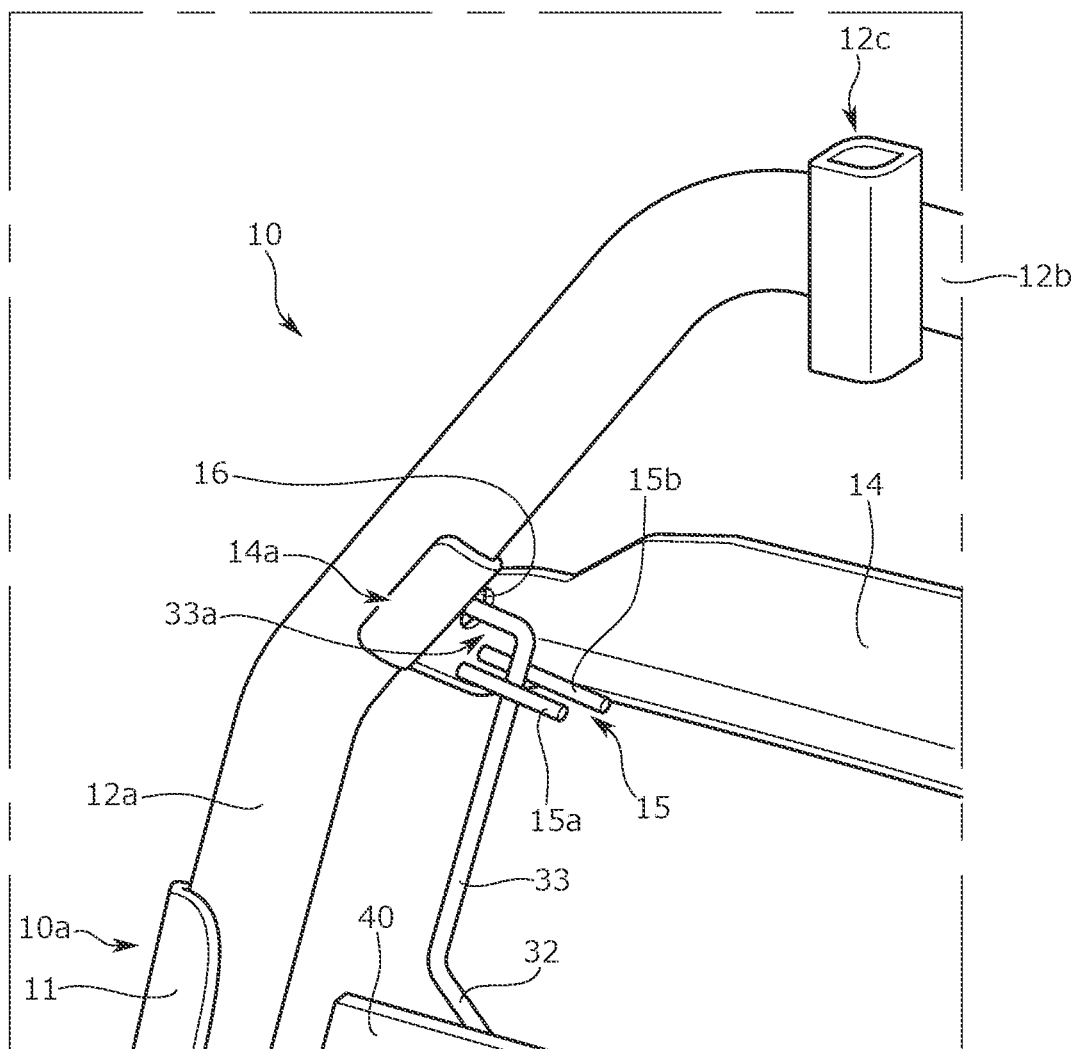
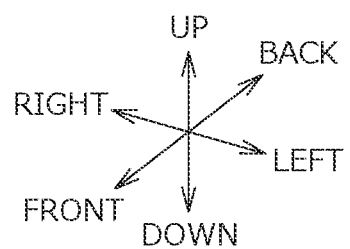

FIG. 8
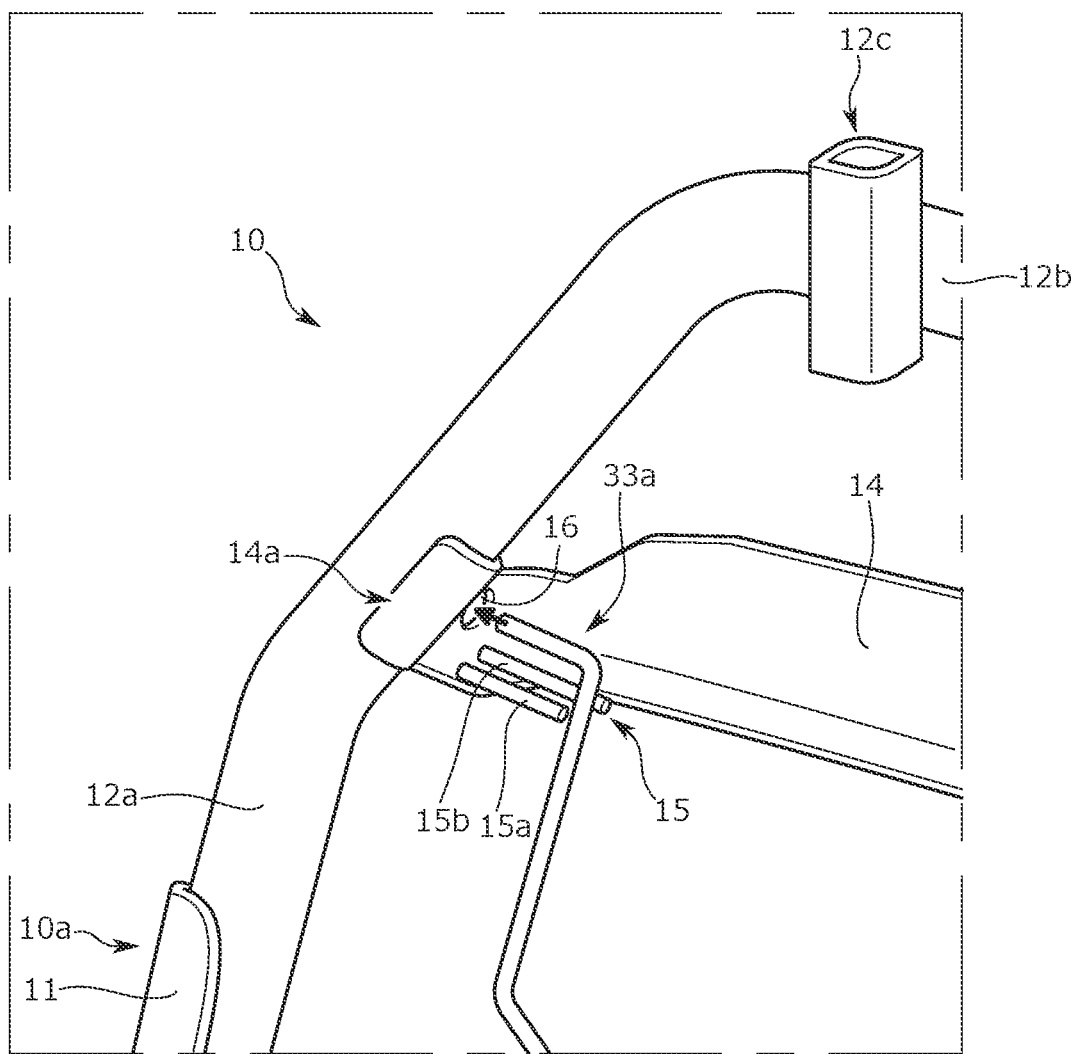
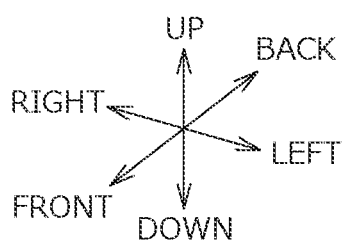

FIG. 9
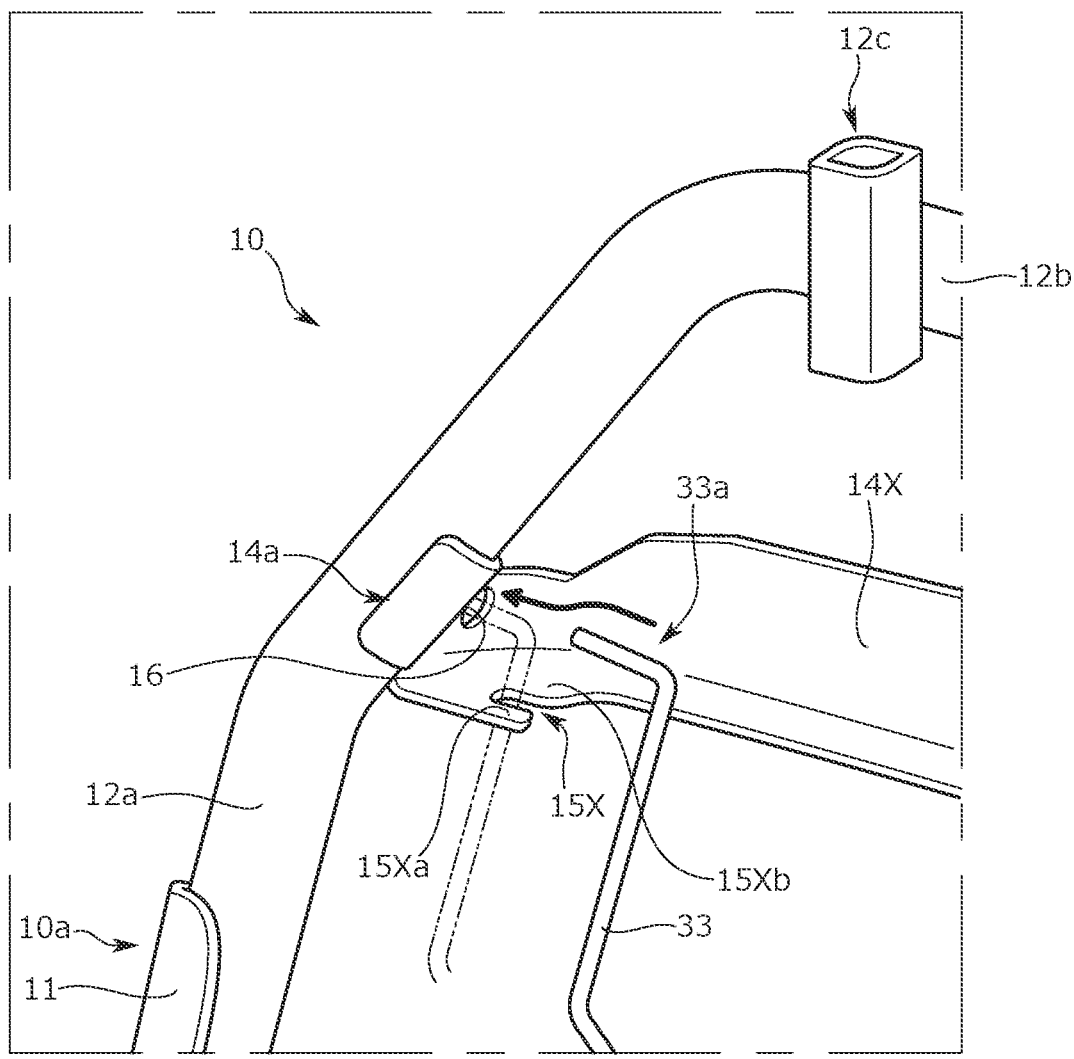
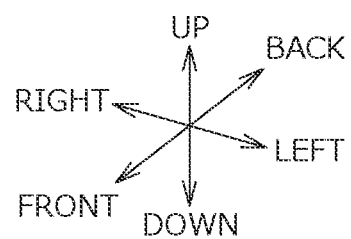

FIG. 10
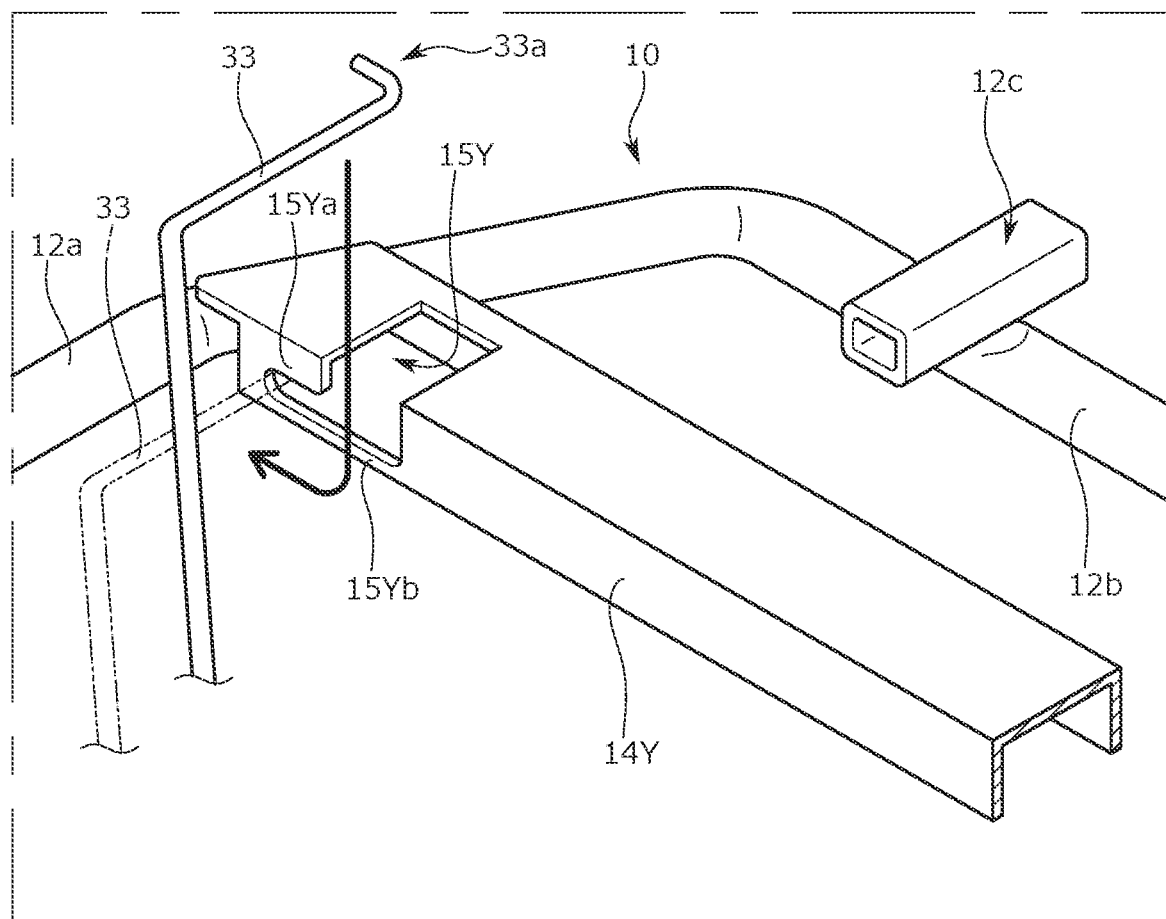
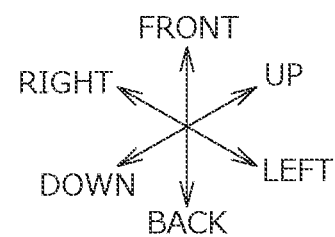

FIG. 11
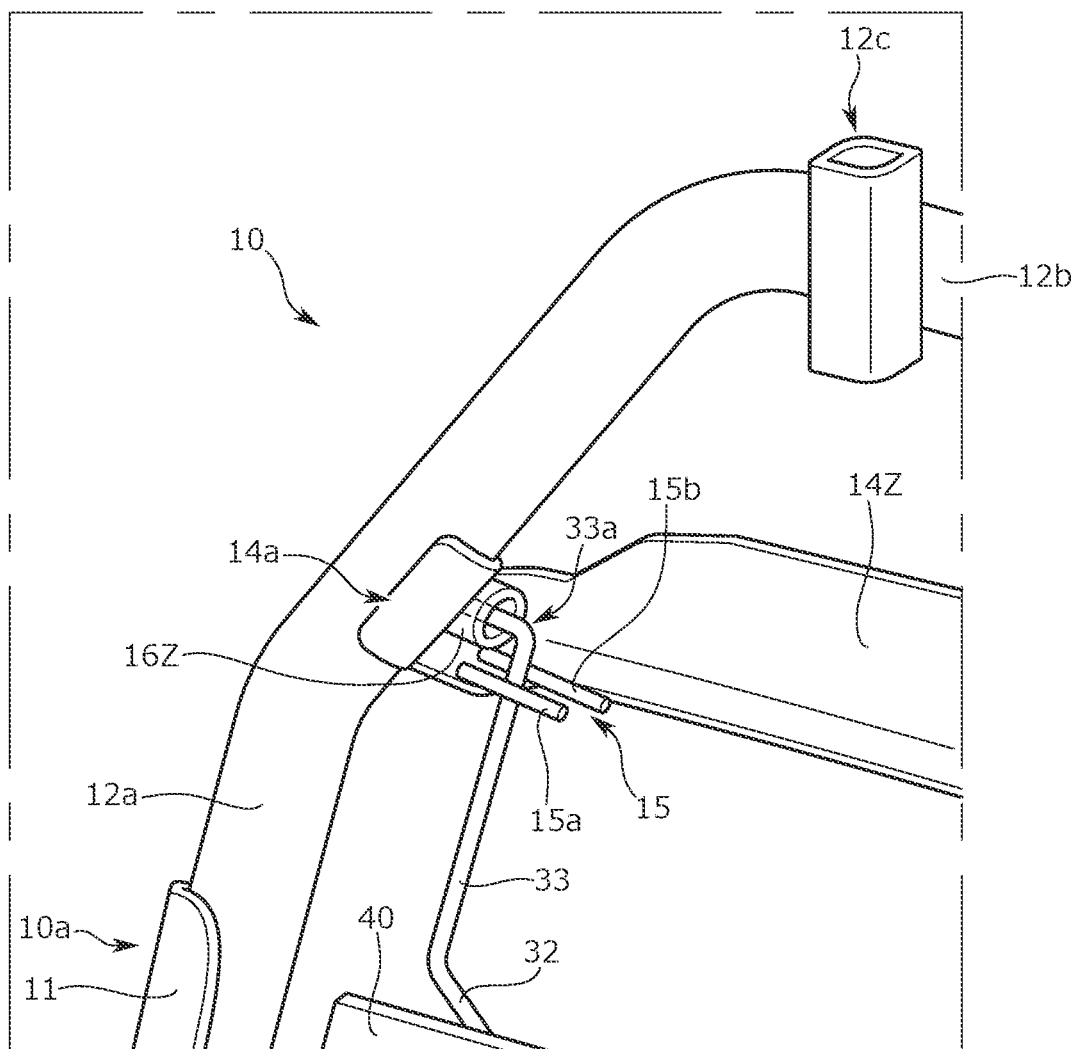
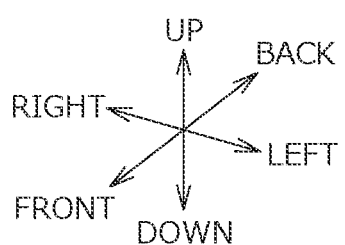

FIG. 12
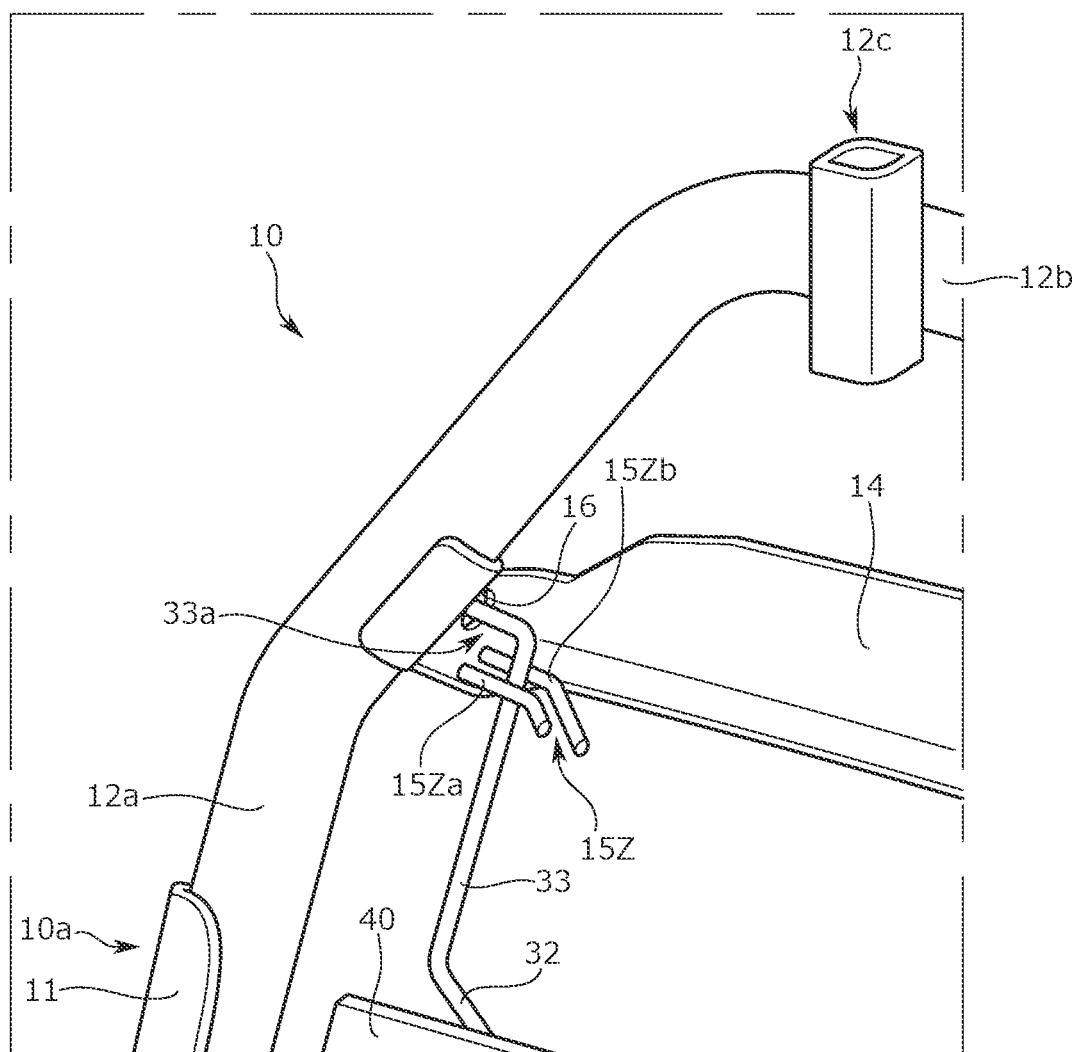
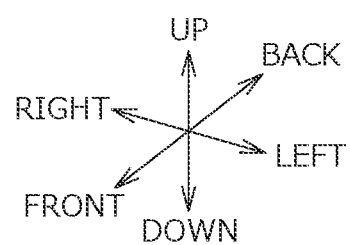

CONVEYANCE SEAT AND CONVEYANCE SEAT MANUFACTURING METHOD

CROSS REFERENCE TO RELATED APPLICATIONS

This application is the U.S. National Stage entry of International Application No. PCT/JP2020/046714 filed under the Patent Cooperation Treaty on Dec. 15, 2020, which claims priority to Japanese Patent Application No. 2019-226605 filed on Dec. 16, 2019, both of which are incorporated herein by reference.

TECHNICAL FIELD

The present invention relates to a conveyance seat and a conveyance seat manufacturing method, and more particularly to a conveyance seat provided with a wire member connecting a pressure receiving member to a seat frame and a conveyance seat manufacturing method.

BACKGROUND ART

A conveyance seat provided with a plate-shaped pressure receiving member that receives a load from a seated occupant is known in the related art. The conveyance seat described in Patent Literature 1 includes a wire member that connects a pressure receiving member to a seat back frame. The wire member is connected to the seat back frame by inserting an upper end portion into a support hole formed on the lower side of a cross-linking frame.

CITATION LIST

Patent Literature

PATENT LITERATURE 1: JP 2018-144521 A

SUMMARY OF INVENTION

Technical Problem

In the conveyance seat described in Patent Literature 1, it is necessary to insert the end portion of the wire member into the support hole formed in the cross-linking frame, and thus the assemblability of the wire member with respect to a seat frame is low.

The present invention has been made in view of the above, and an object of the present invention is to provide a conveyance seat and a conveyance seat manufacturing method in which the assemblability of a wire member with respect to a seat frame improved.

Solution to Problem

The above object is achieved by means of a conveyance seat of the present invention including a seat frame, in which the seat frame has: a pair of side frames arranged in side portions of the conveyance seat; and a cross-linking frame cross-linking the pair of side frames, a wire member is disposed between the pair of side frames, the cross-linking frame has a wire receiving portion receiving the wire member, and the wire member is fastened to the wire receiving portion.

In the conveyance seat of the present invention configured as described above, the wire member is assembled to the seat frame by being fastened to the wire receiving portion, and thus the assemblability of the wire member with respect to the seat frame is improved.

In addition, in the above configuration, the wire member may be fastened to the wire receiving portion in a width direction of the conveyance seat.

In the above configuration, the wire member is fastened to the wire receiving portion in the seat width direction, and thus the wire member can be easily assembled to the seat frame.

In addition, in the above configuration, an end portion of the wire member in a width direction of the conveyance seat may be bent outward and inserted through an end portion receiving portion provided in the cross-linking frame.

In the above configuration, the end portion of the wire member is held at an appropriate position.

In addition, in the above configuration, the wire receiving portion may have a first part close to an occupant support surface and a second part far from the occupant support surface, and the first part may be formed shorter than the second part in a width direction of the conveyance seat.

In the above configuration, when the wire member is assembled to the seat frame, the first part is not an obstacle and fastening to the wire receiving portion can be performed by abutting against the second part and sliding.

In addition, in the above configuration, the wire receiving portion may be formed so as to be curved in a direction toward an occupant support surface.

In the above configuration, the wire member can be guided to the wire receiving portion.

In addition, in the above configuration, a planar pressure receiving member may be attached to the wire member.

In the related art, it is necessary to insert an end portion of a wire member molded integrally with a planar pressure receiving member into a support hole formed in a cross-linking frame. On the other hand, in the above configuration, the wire member can be separated from the planar pressure receiving member and the pressure receiving member can be attached to the wire member at any timing before or after fastening to the wire receiving portion.

In addition, in the above configuration, the wire member may be disposed so as co be separated in a width direction of the conveyance seat, and a distance between the wire members disposed so as to be separated in the width direction of the conveyance seat may increase toward the cross-linking frame.

In the above configuration, the position of the pressure receiving member with respect to the wire member is regulated.

In addition, in the above configuration, the pressure receiving member may be provided with an engaging portion for firing to the wire member on a side opposite to an occupant support surface, and the engaging portion may be provided with an inclined portion inclined outward in the width direction of the conveyance seat.

In the above configuration, the wire member is fixed so as to be guided to the engaging portion of the pressure receiving member, and thus the assemblability of the pressure receiving member with respect to the wire member is improved.

The above object is achieved by means of a method for manufacturing a conveyance seat of the present invention including: a step of preparing a seat frame having a pair of side frames arranged in side portions of the conveyance seat and a cross-linking frame cross-linking the pair of side frames; a step of fastening a wire member to a wire receiving portion of the cross-linking frame; and a step of attaching a skin material and a pad member to the seat frame.

In the conveyance seat manufacturing method of the present invention as described above, the wire member is assembled to the seat frame by being fastened to the wire receiving portion in the seat width direction, and thus the assemblability of the wire member with respect to the seat frame is improved.

In addition, in the above configuration, the wire member may move from an inside to an outside in a width direction of the conveyance seat and be fastened to the wire receiving portion.

In the above configuration, the wire member can be easily assembled to the seat frame.

Advantageous Effects of Invention

According to the conveyance seat of the present invention, the wire member is assembled to the seat frame by being fastened to the wire receiving portion, and thus the assemblability of the wire member with respect to the seat frame is improved.

In addition, according to the conveyance seat of the present invention, the wire member is fastened to the wire receiving portion in the seat width direction, and thus the wire member can be easily assembled to the seat frame.

In addition, according to the conveyance seat of the present invention, the end portion of the wire member is held at an appropriate position.

In addition, according to the conveyance seat of the present invention, when the wire member is assembled to the seat frame, the first part is not an obstacle and fastening to the wire receiving portion can be performed by abutting against the second part and sliding.

In addition, according to the conveyance seat of the present invention, the wire member can be guided to the wire receiving portion.

In the related art, it is necessary to insert an end portion of a wire member molded integrally with a planar pressure receiving member into a support hole formed in a cross-linking frame. On the other hand, according to the conveyance seat of the present invention, the wire member can be separated from the planar pressure receiving member and the pressure receiving member can be attached to the wire member at any timing before or after fastening to the wire receiving portion.

In addition, according to the conveyance seat of the present invention, the position of the pressure receiving member with respect to the wire member is regulated.

In addition, according to the conveyance seat of the present invention, the wire member is fixed so as to be guided to the engaging portion of the pressure receiving member, and thus the assemblability of the pressure receiving member with respect to the wire member is improved.

In addition, according to the conveyance seat of the present invention, the wire member is assembled to the seat frame by being fastened to the wire receiving portion in the seat width direction, and thus the assemblability of the wire member with respect to the seat frame is improved.

In addition, according to the conveyance seat of the present invention, the wire member can be easily assembled to the seat frame.

BRIEF DESCRIPTION OF DRAWINGS

FIG. 4 is an enlarged view of the vicinity of a wire receiving portion of a cross-linking frame.

FIG. 8 is a schematic diagram illustrating a state in the process of engaging the wire member with the wire receiving portion.

FIG. 9 is a diagram illustrating a (first) modification example of the cross-linking frame.

FIG. 10 is a diagram illustrating a (second) modification example of the cross-linking frame.

FIG. 11 is a diagram illustrating a (third) modification example of the cross-linking frame.

FIG. 12 is a diagram illustrating a (fourth) modification example of the cross-linking frame.

DESCRIPTION OF EMBODIMENTS

Hereinafter, a conveyance seat and a conveyance seat manufacturing method according to an embodiment of the present invention (hereinafter, the present embodiment) be described with reference to FIGS. 1 to 18. Although a vehicle seat mounted in a vehicle will be described as an example of the conveyance seat according to the present embodiment, the conveyance seat is not limited to a vehicle seat mounted in a ground-traveling wheeled conveyance such as an automobile and a railroad vehicle and may be a seat mounted in a non-ground conveyance such as an aircraft and a ship.

It should be noted that the embodiment described below is merely an example for facilitating the understanding of the present invention and does not limit the present invention. In other words, the shapes, dimensions, dispositions, and so on of the members described below can be changed and improved without departing from the spirit of the present invention, and it is a matter of course that the present invention includes equivalents thereof.

Figure 1:
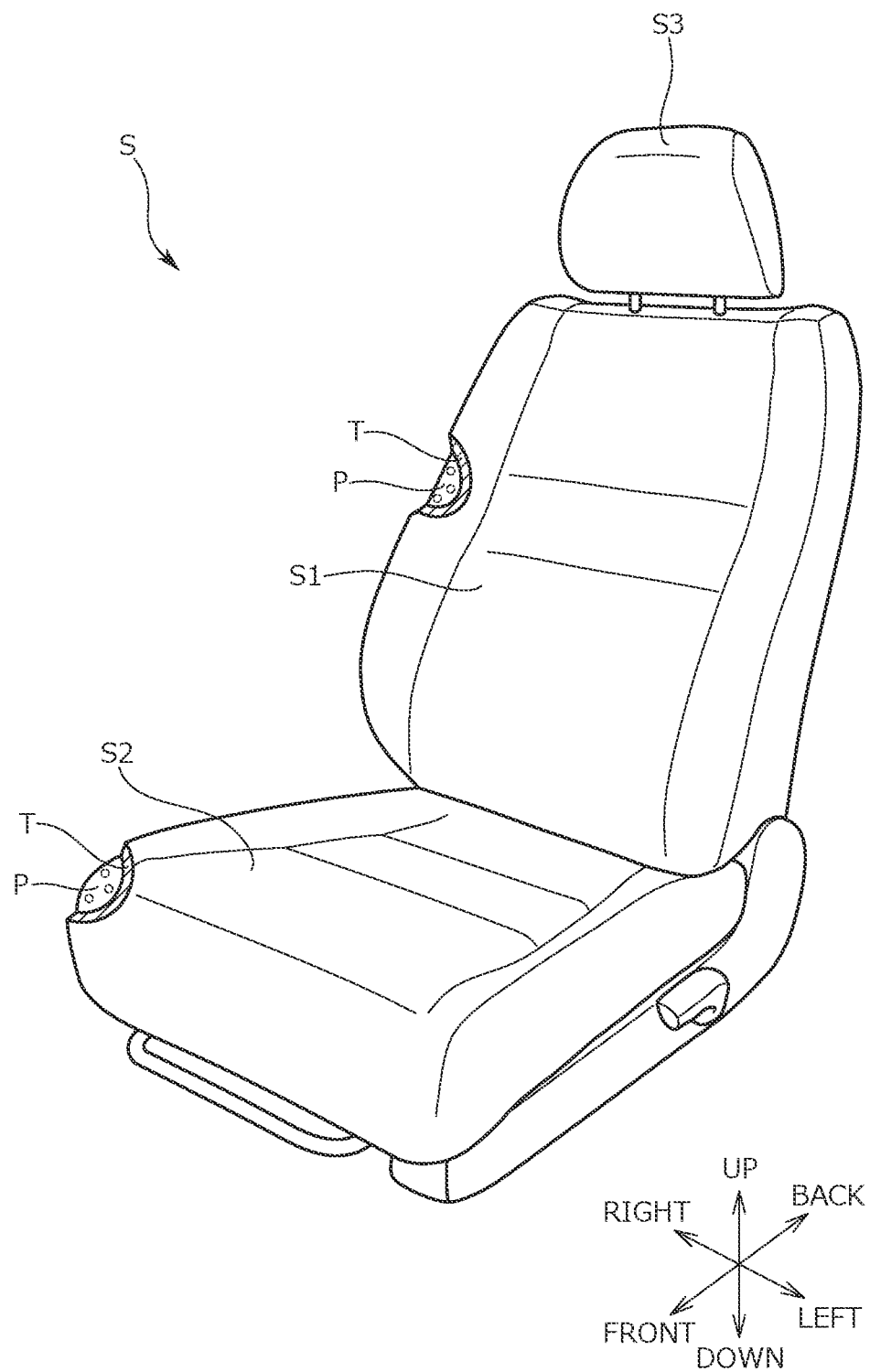
FIG. 1 is an external view of a vehicle seat according to an embodiment of the present invention.

Regarding direction-indicating terms in the present specification, each direction is defined as in FIG. 1. Specifically, in the following description, the "front to back direction" means the front to back direction that is viewed from a seated occupant in the vehicle seat and coincides with the direction in which the vehicle travels. The "seat width direction" means the breadth direction of the vehicle seat and coincides with the right to left direction that is viewed from the seated occupant in the vehicle seat. In addition, the "up to down direction" means the height direction of the vehicle seat and coincides with the up to down direction at a time when the vehicle seat is viewed from the front.

1. Main Configuration of Vehicle Seat S

A vehicle seat S according to the present embodiment has the appearance that is illustrated in FIG. 1. It should be noted that in FIG. 1, for convenience of illustration, a part of the vehicle seat S (specifically, a part of a seat back S1 and the front end corner portion of a seat cushion S2) is illustrated in a configuration in which a skin material T is removed.

The vehicle seat S has, as main components, the seat back S1 as a backrest part supporting the back of the seated occupant (occupant), the seat cushion S2 as a seating part supporting the buttocks and thighs of the seated occupant, and a headrest S3 arranged on the upper portion of the seat back S1 and supporting the head of the seated occupant.

The seat back S1 configured by placing a pad member P on a seat back frame 10 as a skeleton and covering the pad member P with the skin material T. The seat cushion S2 is configured by placing the pad member P on a seat cushion frame 20 and covering the pad member P with the skin material T. The headrest S3 is formed by arranging a pad member (not illustrated) on core material (not illustrated) and covering the pad member with the skin material T.

2. Overview of Seat Frame 1

Figure 2:
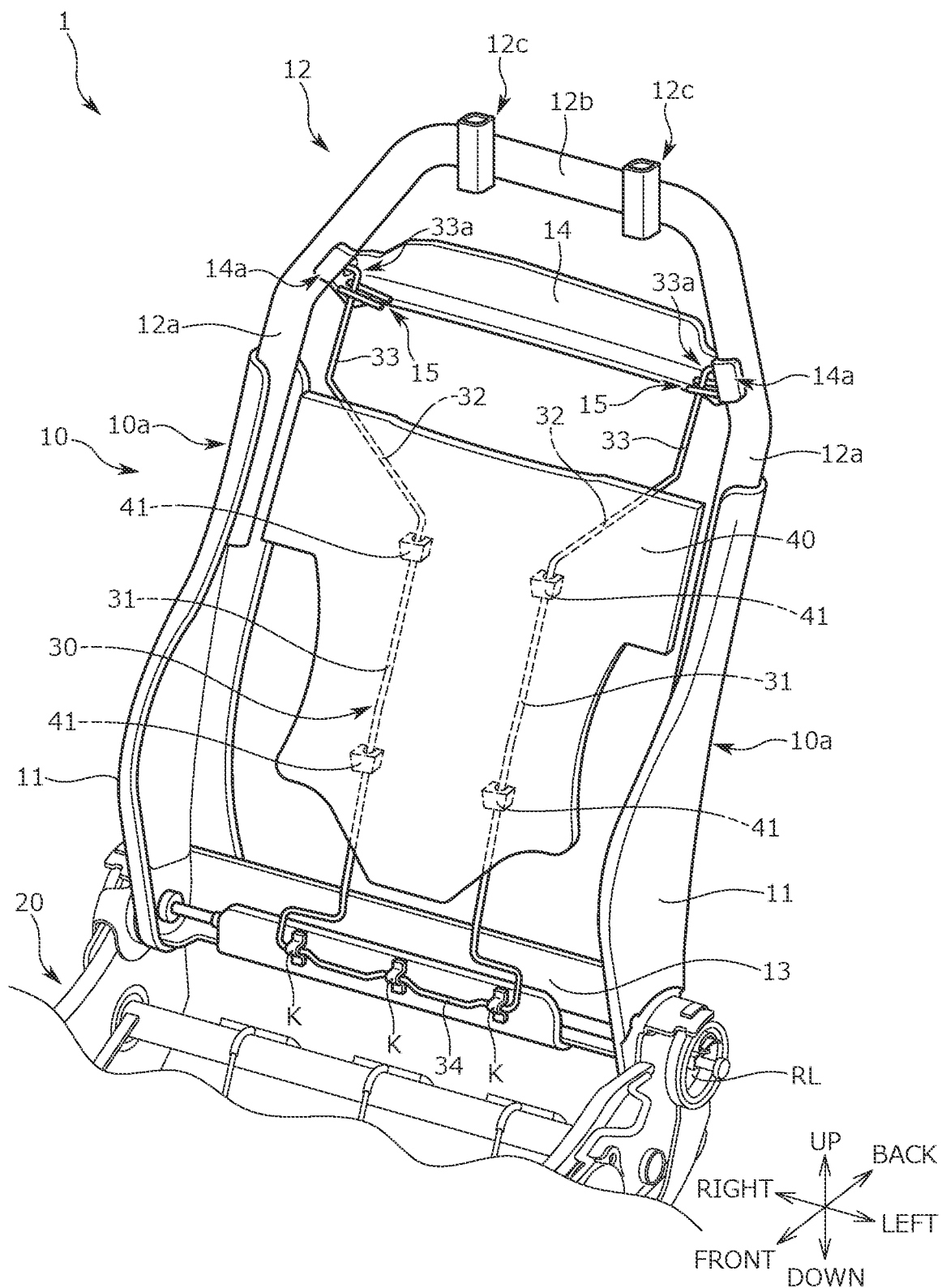
FIG. 2 is a perspective view of a seat frame of the vehicle seat according to the embodiment of the present invention.

First, an overview of the configuration of a seat frame 1 will be described with reference to FIGS. 2 and 3. As illustrated in FIG. 2, the seat frame 1 is mainly configured by the seat back frame 10 and the seat cushion frame 20. The seat back frame 10 forms the skeleton of the backrest part in the seat frame 1, and the seat cushion frame 20 forms the skeleton of the seating part in the seat frame 1. The seat back frame 10 is connected to the seat cushion frame 20 via a reclining mechanism RL.

(Seat Back Frame 10)

Figure 3:
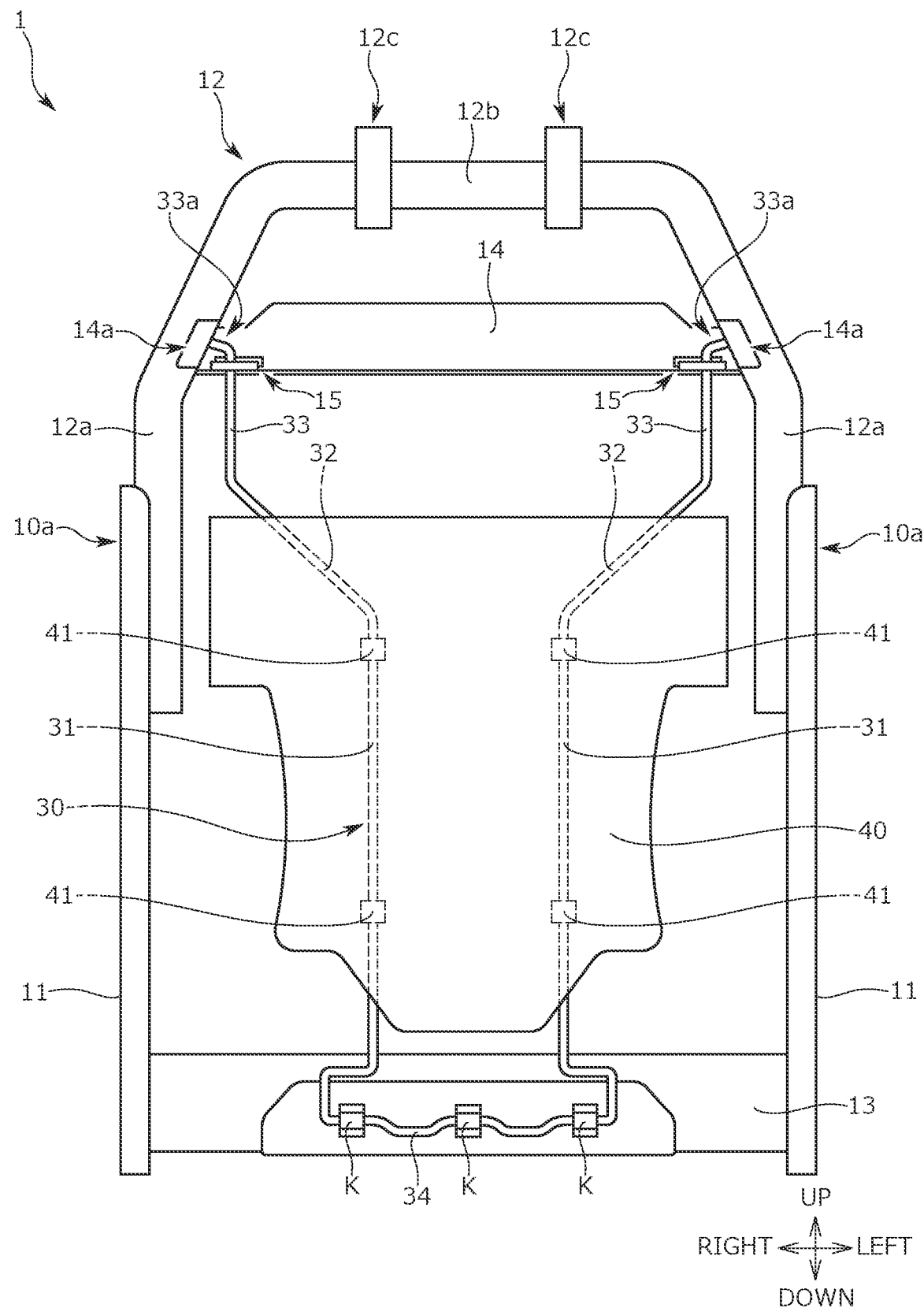
FIG. 3 is a front view of a seat back frame of the vehicle seat according to the embodiment of the present invention.

As illustrated in FIGS. 2 and 3, the seat back frame 10 includes a pair of right and left main side frames 11, an upper frame 12 as a pipe frame, a lower frame 13 as a lower connecting frame, and a cross-linking frame 14 as a cross member.

The pair of main side frames 11 are disposed so as to be separated from each other in a state of facing each other in the seat width direction (right to left direction) in order to define the width of the seat back S1. Both of the main side frames 11 are arranged so as to extend in the up to down direction and are formed in a long shape.

The upper frame 12 is configured by bending a metallic pipe material. The upper frame 12 has a pair of right and left upper side frames 12a (upper frame side portions) extending substantially in the up to down direction and an upper connecting frame 12b extending so as to interconnect the upper ends of the upper side frames 12a.

The pair of upper side frames 12a configure a pair of back side frames 10a together with the pair of main side frames 11 by the lower portions of the pair of upper side frames 12a being connected by welding to the upper portions of the main side frames 11. The pair of back side frames 10a are arranged in the side portions of the vehicle seat S to configure the right and left frames of the seat back S1.

In addition, pillar support portions 12c are attached to the upper connecting frame 12b by welding. The pillar support portions 12c are tubular bodies through which two headrest pillars (not illustrated) hanging from the headrest S3 are inserted.

The lower frame 13 is a member that interconnects the lower portions of the pair of back side frames 10a. The right and left end portions of the lower frame 13 are connected by welding to the main side frames 11 configuring the back side frames 10a.

The cross-linking frame 14 is a member that interconnects the upper portions of the pair of back side frames 10a. Right and left end portions 14a of the cross-linking frame 14 are connected by welding or the like to the upper portions of the upper side frames 12a configuring the back side frames 10a. As for the cross-linking frame 14, wire receiving portions 15 (see FIG. 4) receiving a wire member 30 to be described later (specifically, upper connecting portions 33) are formed in the right and left end Portions 14a.

It should be noted that the configurations of the wire receiving portions 15 on the right side and the left side in the seat width direction are the same. Accordingly, hereinafter, the configuration in one end portion (right side) will be described as a representative if necessary. The wire receiving pardon 15 is formed as a recessed portion recessed from the inside toward the outside in the seat width direction.

The wire receiving portion 15 has a front part 15a (first part) close to an occupant support surface and a rear part 15b (second part) far from, the occupant support surface. In the seat width direction, the front part 15a is formed shorter than the rear part 15b.

The cross-linking frame 14 has an end portion receiving portion 16 in each of the right and left end portions 14a. The end portion receiving portion 16 is an opening that receives a wire end portion 33a of the wire member 30.

The wire member 30 and a pressure receiving member 40 are disposed between the pair of back side frames 10a of the seat back frame 10.

(Wire Member 30)

As illustrated in FIGS. 2 and 3, the wire member 30 is a member that connects the pressure receiving member 40 to the seat back frame 10 and mainly has a pair of right and left extending portions 31, inclined portions 32, the upper connecting portions 33, and a lower connecting portion 34.

The extending portions 31 extend in the up to down direction as a predetermined direction (orthogonal direction orthogonal to the seat width direction) and are disposed side by side in the seat width direction. The planar pressure receiving member 40, which will be described later, is attached to the extending portion 31 or the wire member 30. The inclined portion 32 extends diagonally upward from the upper end of the extending portion 31 to the outside in the seat width direction.

The upper connecting portion 33 extends upward from the upper end of the inclined portion 32. As illustrated in FIG. 4, the upper connecting portion 33 of the wire member 30 has the wire end portion 33a, which has a seat-width-direction end portion bent toward the outside. The wire end portion 33a is inserted through the end portion receiving portion 16 provided in the cross-linking frame 14, and thus the wire end portion 33a is held at an appropriate position. In addition, it is suppressed that the wire end portion 33a comes off from the end portion receiving portion 16.

The lower connecting portion 34 connects the pair of right and left extending portions 31, the inclined portions 32, and the upper connecting portions 33. More specifically, the lower connecting portion 34 has a lower end portion extending in the seat width direction, bends after extending upward from the right and left ends of the lower end portion, and extends toward the inside in the seat width direction to be connected to the lower ends of the extending portions 31.

The wire member 30 is connected to the seat back frame 10 by the lower connecting portion 34 being fastened to the front side of the lower frame 13 by a fixing member K and the upper connecting portion 33 being fastened to the wire receiving portion 15 formed in the end portion 14a of the cross-linking frame 14.

More specifically, the wire member 30 (upper connecting portion 33) is fastened to the wire receiving portion 15 from the inside toward the outside in the seat width direction. At this time, it is preferable that the extending portion 31, the inclined portion 32, and the upper connecting portion 33 of the wire member 30 are urged (widened) toward the outside in the seat width direction. This is because the wire member is stably fastened as a result of the urging.

In this manner, the wire member 30 is assembled to the seat back frame 10 by the upper connecting portion 33 being fastened to the wire receiving portion 15 in the seat width direction. Accordingly, the wire member 30 can be easily assembled to the seat back frame 10, and the assemblability of the wire member 30 with respect to the seat back frame 10 is improved. In addition, the upper connecting portion 33 coming off is suppressed since the upper connecting portion 33 of the wire member 30 is urged outward in the seat width direction and is fastened to the wire receiving portion 15 so as to widen.

(Pressure Receiving Member 40)

The pressure receiving member 40 is a plate-shaped member receiving a load from an occupant in the vehicle seat S and is formed of a material such as resin. The pressure receiving member 40 is disposed so as to face the back of the occupant.

Figure 5:
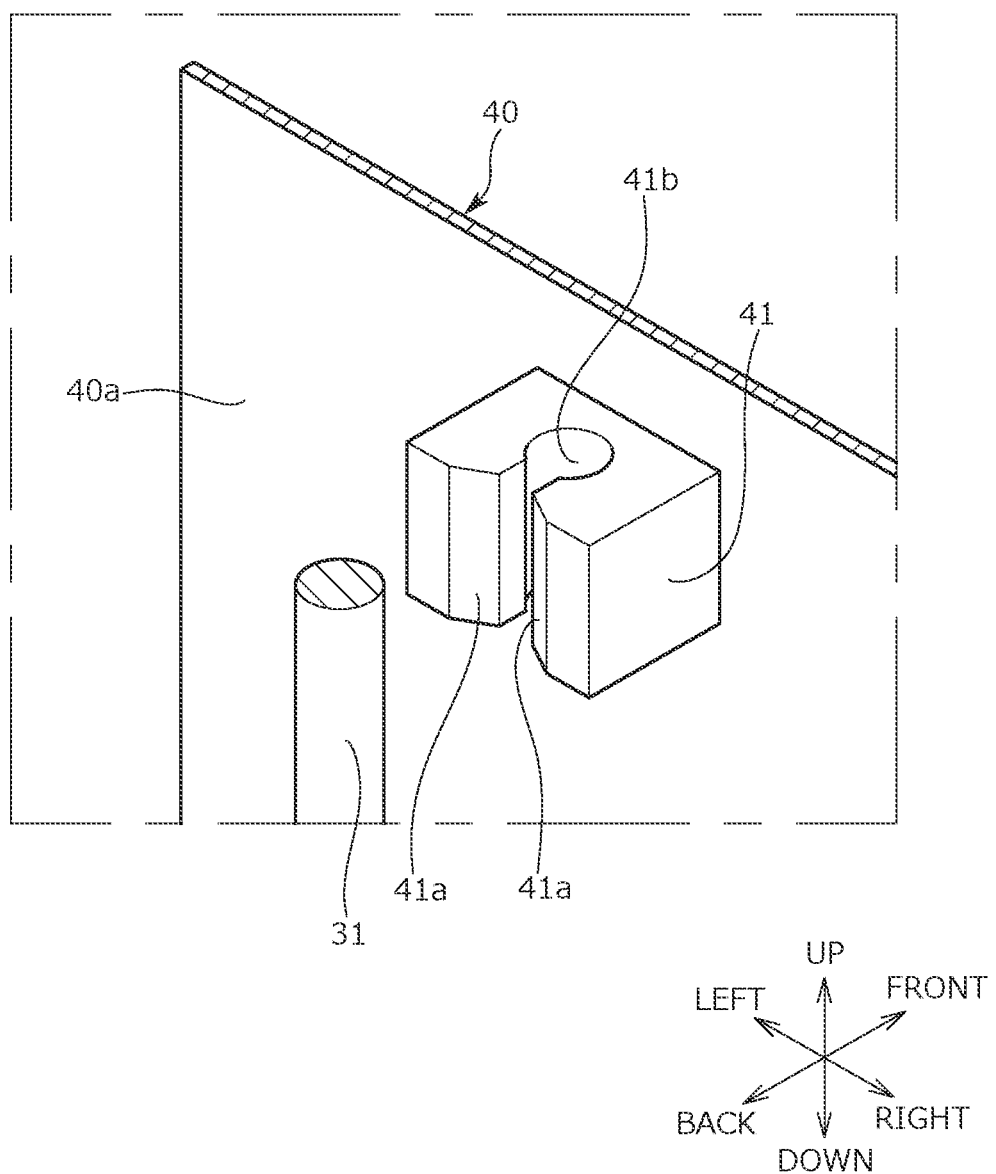
FIG. 5 is an enlarged view illustrating an engaging Portion of a pressure receiving member.

As illustrated in FIG. 5, the pressure receiving member 40 is provided with an engaging portion 41 for engaging with the wire member 30 and fixing the pressure receiving member 40 on a back surface 40a on the side opposite to the occupant support surface. The engaging portion 41 includes an inclined portion 41a inclined outward in the seat width direction. In such a configuration, the extending portion 31 of the wire member 30 is fixed to the engaging portion 41 of the pressure receiving member 40 so as to be guided by the inclined portion 41a, and thus the assemblability of the pressure receiving member 40 with respect to the wire member 30 is improved.

The pressure receiving member 40 is disposed on the front side of the pair of extending portions 31 of the wire member 30, and the engaging portion 41 of the back surface 40a engages with the extending portion 31. In this manner, the pressure receiving member 40 is connected to the seat back frame 10 via the wire member 30. In other words, the pair of extending portions 31 are disposed at positions overlapping the pressure receiving member 40 when viewed from the front side.

3. Vehicle Seat Manufacturing Method

Figure 6:
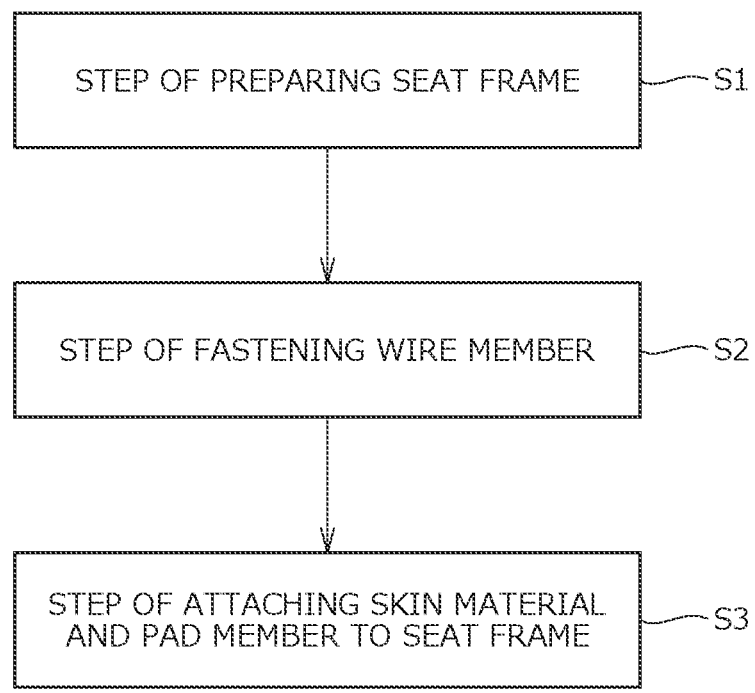
FIG. 6 is a flowchart of a vehicle seat manufacturing method according to an embodiment of the present invention.

As illustrated in FIG. 6, the vehicle seat S of the present embodiment is manufactured by the following vehicle seat manufacturing method.

Specifically, the vehicle seat manufacturing method according to the present embodiment includes a step (step ST1) of preparing the seat frame 1 having the pair of back side frames 10a (pair of side frames) arranged in the side portions of the vehicle seat S and the cross-linking frame 14 cross-linking the pair of back side frames 10a (pair of side frames), a step (step ST2) of fastening the wire member 30 to the wire receiving portion 15 of the cross-linking frame 14, and a step (step ST3) of attaching the skin material T and the pad member P to the seat frame 1.

Hereinafter, each step will be described in detail.

The seat frame 1 having the seat back frame 10 as illustrated in FIGS. 2 and 3 is prepared in the step (step ST1) of preparing the seat frame 1 having the pair of back side frames 10a arranged in the side portions of the vehicle seat S and the cross-linking frame 14 cross-linking the pair of back side frames 10a.

Specifically, the seat back frame 10 including the pair of right and left main side frames 11, the upper frame 12 as a pipe frame, the lower frame 13 as a lower connecting frame, and the cross-linking frame 14 as a cross member is prepared.

Figure 7:
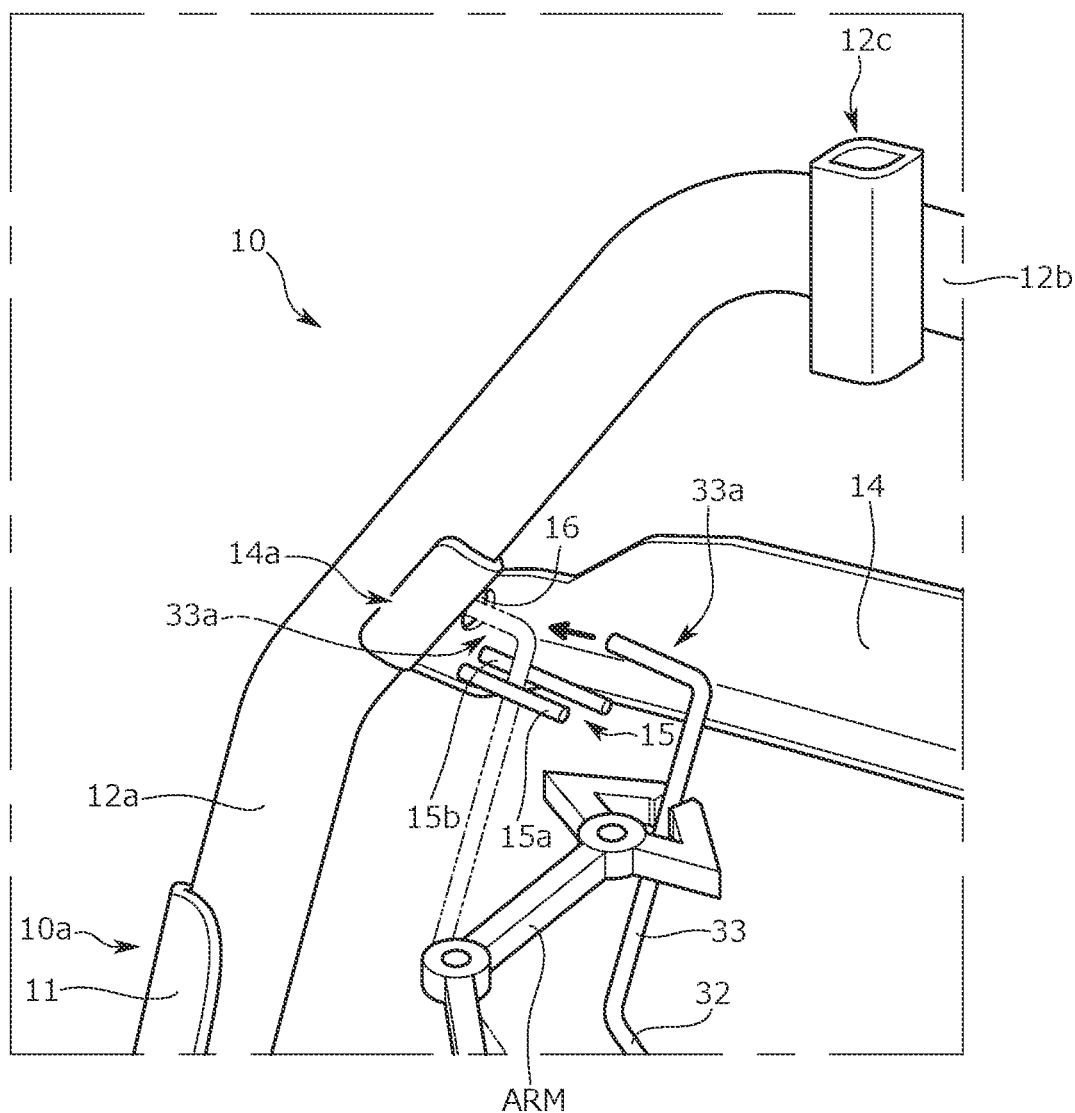
FIG. 7 is a schematic diagram illustrating a state before and after engaging a wire member with the wire receiving portion.

Next, in the step (step ST2) of fastening the wire member 30 to the wire receiving portion 15 of the cross-linking frame 14, the upper connecting portion 33 of the wire member 30 moves from the inside to the outside in the seat width direction and is fastened to the wire receiving portion 15 (FIG. 7). At this time, the wire end portion 33a of the wire member 30 moves from the inside to the outside in the seat width direction and is inserted into the end portion receiving portion 16.

FIG. 7 illustrates an example in which the upper connecting portion 33 of the wire member 30 is operated by a working arm ARM of a robot. At this time, the fastening of the upper connecting portion 33 to the wire receiving portion 15 may be performed substantially at the same time as the fixing of the lower connecting portion 34 to the front side of the lower frame 13 by the fixing member K.

As described above, the wire receiving portion 15 is formed such that the front part 15a is shorter than the rear part 15b in the seat width direction. Accordingly, the front part 15a (first part) is not an obstacle when the wire member 30 is assembled to the seat back frame 10 from the front (FIG. 7).

In addition, the vicinity of the wire end portion 33a of the upper connecting portion 33 can be fastened to the wire receiving portion 15 by abutting against the rear part 15b (second part) from the front (FIG. 8) and sliding outward in the seat width direction. At this time, in the seat width direction, the insertion directions in fastening the upper connecting portion 33 (wire end portion 33a) are opposite on the right side (FIG. 4) and the left side (not illustrated).

Next, the skin material T and the pad member P are attached to each of the seat back frame 10 and the seat cushion frame 20 in the step (step ST3) of attaching the skin material T and the pad member P to the seat frame 1.

According to the vehicle seat manufacturing method of the present embodiment, the wire member 30 (upper connecting portion 33) is assembled to the seat back frame 10 by being fastened to the wire receiving portion 15 in the seat width direction, and thus the assemblability of the wire member 30 with respect to the seat back frame 10 is improved.

In addition, since the wire member 30 moves from the inside to the outside in the seat width direction and is fastened to the wire receiving portion 15, the wire member 30 can be easily assembled to the seat back frame 10.

In the related art, it is necessary to insert an end portion of a wire member molded integrally with a planar pressure receiving member into a support hole formed in a cross-linking frame. On the other hand, according to the vehicle seat manufacturing method of the present embodiment, the upper connecting portion 33 (wire end portion 33a) of the wire member 30 is configured to be fastened to the wire receiving portion 15 in the seat width direction. Accordingly, it is possible to separate the wire member 30 from the planar pressure receiving member 40 and attach the pressure receiving member 40 to the wire member 30 at any timing before or after fastening to the wire receiving portion 15.

In other words, the step of attaching the planar pressure receiving member 40 to the wire member 30 can be performed at any timing before or after the step (step ST2) of fastening the wire member 30 to the wire receiving portion 15 of the cross-linking frame 14.

In particular, in the vehicle seat manufacturing method of the present embodiment, after the wire member 30 is fastened to the wire receiving portion 15 of the cross-linking frame 14, the planar pressure receiving member 40 can be engaged and fixed to the wire member 30 (extending portion 31) from the front (seated occupant side).

The movement of the wire member 30 at this time is a movement in the front to back direction (approach of the entire wire member 30 to the seat back frame 10) and a movement in the width direction (movement of the upper connecting portion 33 from the inside to the outside in the seat width direction) in the front view of the seat back frame 10.

In other words, it is not necessary to move the wire member 30 in the up to down direction between the pair of back side frames 10a of the seat back frame 10 as in the related art. Further, at a point in time when the work of assembling the wire member 30 to the seat hack frame 10 is performed, the wire member 30 and the pressure receiving member 40 can be separated from each other.

Accordingly, although it is usually difficult for a robot to respond to a complex movement, in the vehicle seat manufacturing method of the present embodiment, it is possible to assemble the wire member 30 to the seat back frame 10 using a robot and then assemble the planar pressure receiving member 40 to the wire member 30 assembled to the seat back frame 10. It should be noted that by the vehicle seat manufacturing method of the present embodiment, it is also possible for a person to perform manual assembly or to appropriately combine robot-based automatic and human manual works in each step.

4. Modification Examples

The present invention is not limited to the above embodiment. Hereinafter, differences will be mainly described with description of parts identical to those of the above embodiment omitted. FIGS. 9 to 12 illustrate modification examples of the cross-linking frame.

In the above embodiment, the cross-linking frame 14 and the wire receiving portion 15 are formed separately. Alternatively, a wire receiving portion 15X may be formed integrally with a cross-linking frame 14X as illustrated in FIG. 9. Specifically, a front part 15Xa and a rear part 15Xb are formed integrally with an end portion 14Xa of the cross-linking frame 14X and receive the upper connecting portion 33 of the wire member 30. The wire receiving portion 15X is a notch from the inside toward the outside in the seat width direction.

In addition, as illustrated in FIG. 10, a wire receiving portion 15Y may be formed integrally with a cross-linking frame 14Y as a three-dimensionally formed notch. Specifically, the cross-linking frame 14Y includes a front surface, an upper surface, and a lower surface, and the front surface and the lower surface are notched to form the wire receiving portion 15Y.

A front part 15Ya and a rear part 15Y1 are formed on the lower surface of the cross-linking frame 14Y, and the wire end portion 33a of the wire member 30 passes through the front surface notch of the cross-linking frame 14Y and is fastened to the wire receiving portion 15Y.

In the above embodiment, the end portion receiving portion 16 is formed as a hole open in the seat width direction. Alternatively, as illustrated in FIG. 11, an end portion receiving portion 16Z of a cross-linking frame 14Z may be formed in a tubular shape extending in the seat width direction. The end portion of the end portion receiving portion 16Z on the outside in the seat width direction may be open or closed.

Although the wire receiving portion 15 in the above embodiment is formed linearly in the seat width direction, a wire receiving portion 15Z as an alternative may be formed so as to be curved in the direction toward the occupant support surface (forward). Specifically, as illustrated in FIG. 12, a front part 15Za (first part) and a rear part (second part) 15Zb may be formed so as to be curved in the direction toward the occupant support surface (forward). With such a configuration, it is possible to guide the upper connecting portion 33 of the wire member 30 toward the wire receiving portion 15Z.

Seat frames according to modification examples are illustrated in FIGS. 13 to 18. The seat frames according to the modification examples are different from the above embodiment in terms of wire member and pressure receiving member configurations.

First Modification Example

Figure 13:
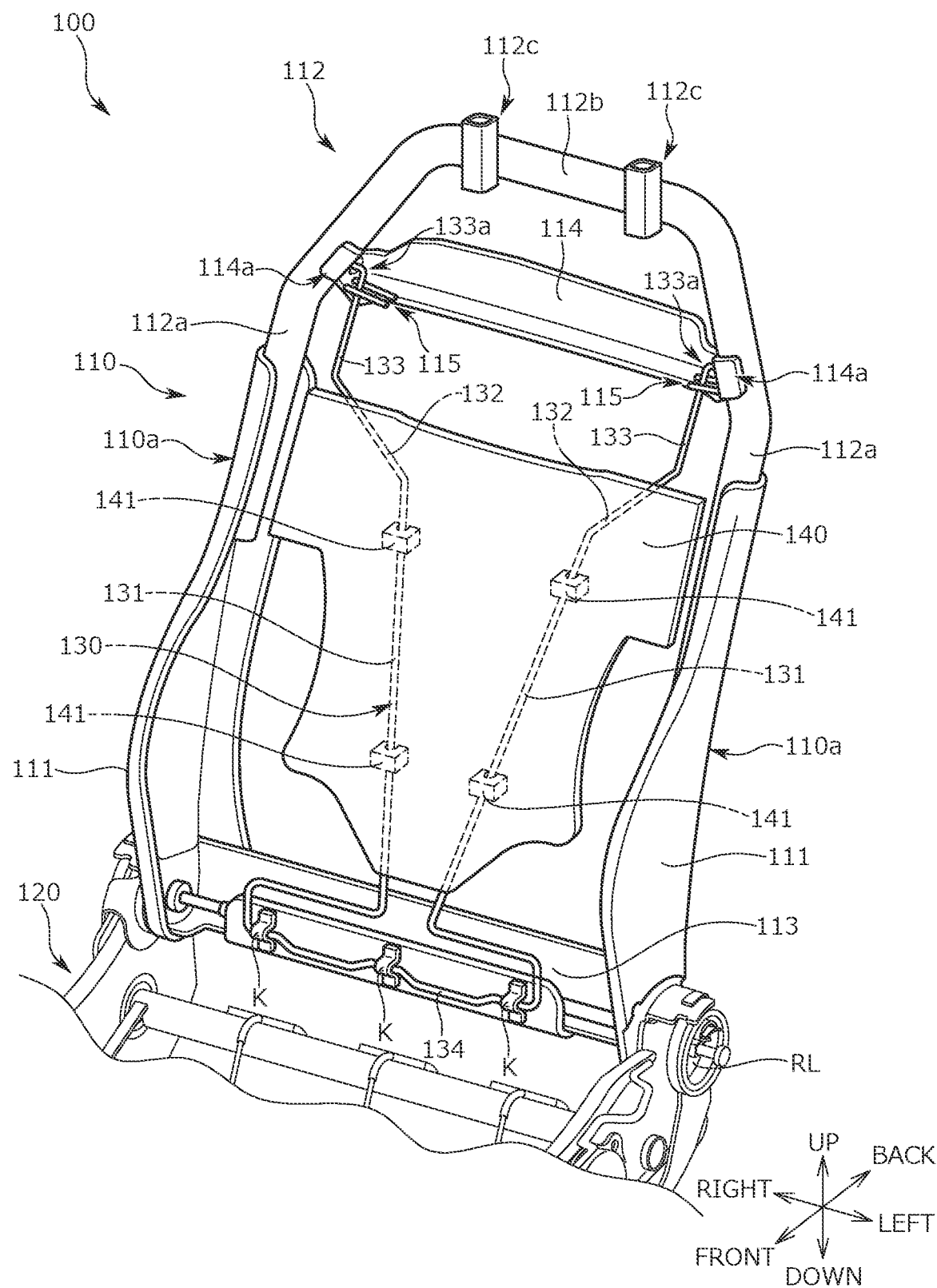
FIG. 13 is a perspective view of a seat frame according to a first modification example.
Figure 14:
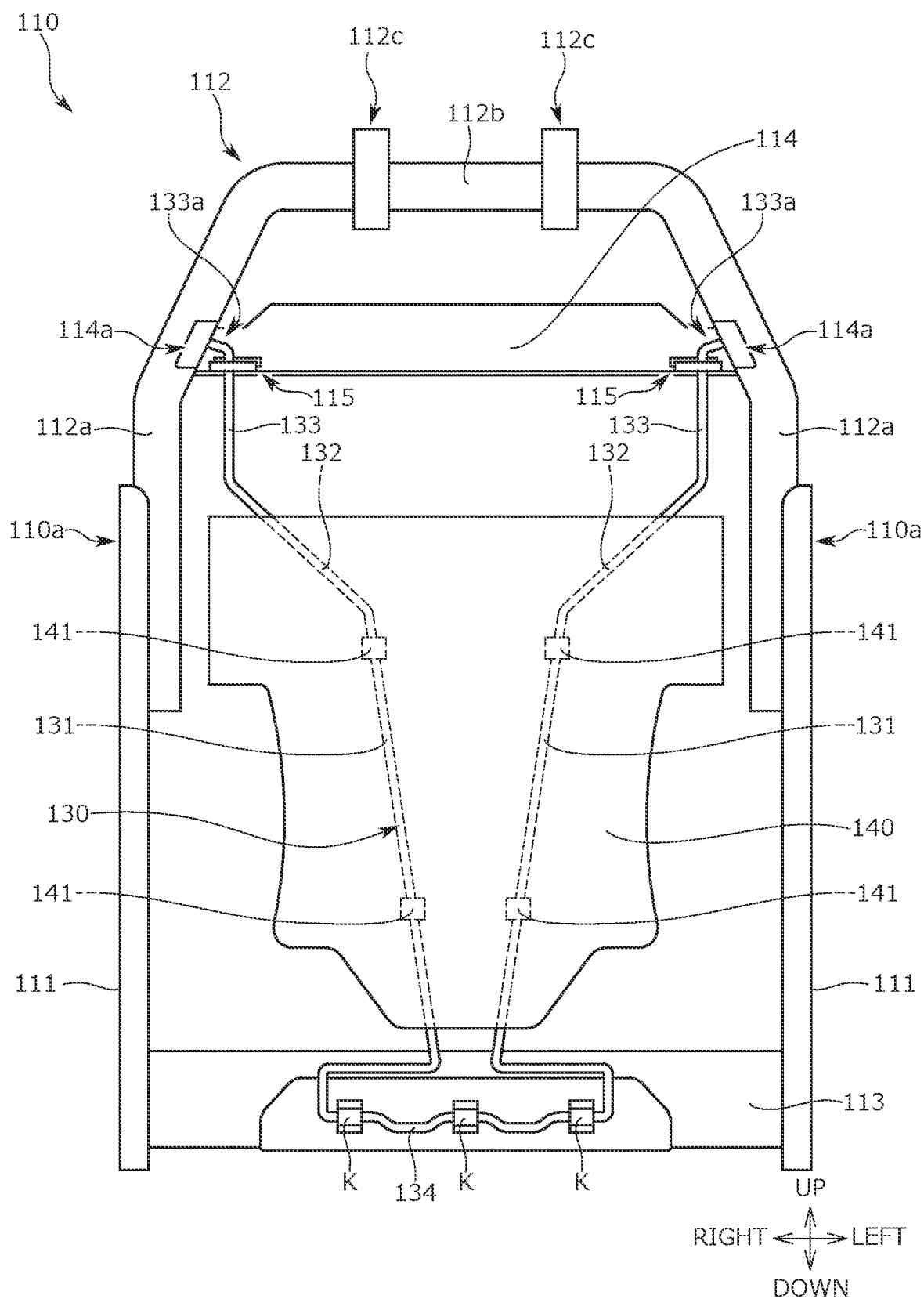
FIG. 14 is a front view of the seat frame according to the first modification example.

FIG. 13 is a perspective view of a seat frame according to a first modification example, and FIG. 14 is a front view of the seat frame according to the first modification example. As illustrated in FIG. 13, a pair of extending portions 131 of a wire member 130 are disposed so as to be separated from each other in the seat width direction. The distance between the extending portions 131 of the wire member 130 disposed so as to be separated from each other in the seat width direction increases from a lower frame 113 on the lower side toward a cross-linking frame 114 on the upper side.

Engaging portions 141 of a pressure receiving member 140 are disposed so as to be separated from each other by a predetermined distance in the seat width direction. The separation distances between the engaging portions 141 are different in the up to down direction. Accordingly, in such a configuration, in a case where the distance between the extending portions 131 of the wire member 130 disposed so as to be separated from each other in the seat width direction substantially coincides with the separation distance between the engaging portions 141, the engaging portion 141 appropriately engages with the extending portion 131. Accordingly, the position of the pressure receiving member 140 with respect to the extending portion 131 of the wire member 130 is regulated to be an appropriate position.

Second Modification Example

Figure 15:
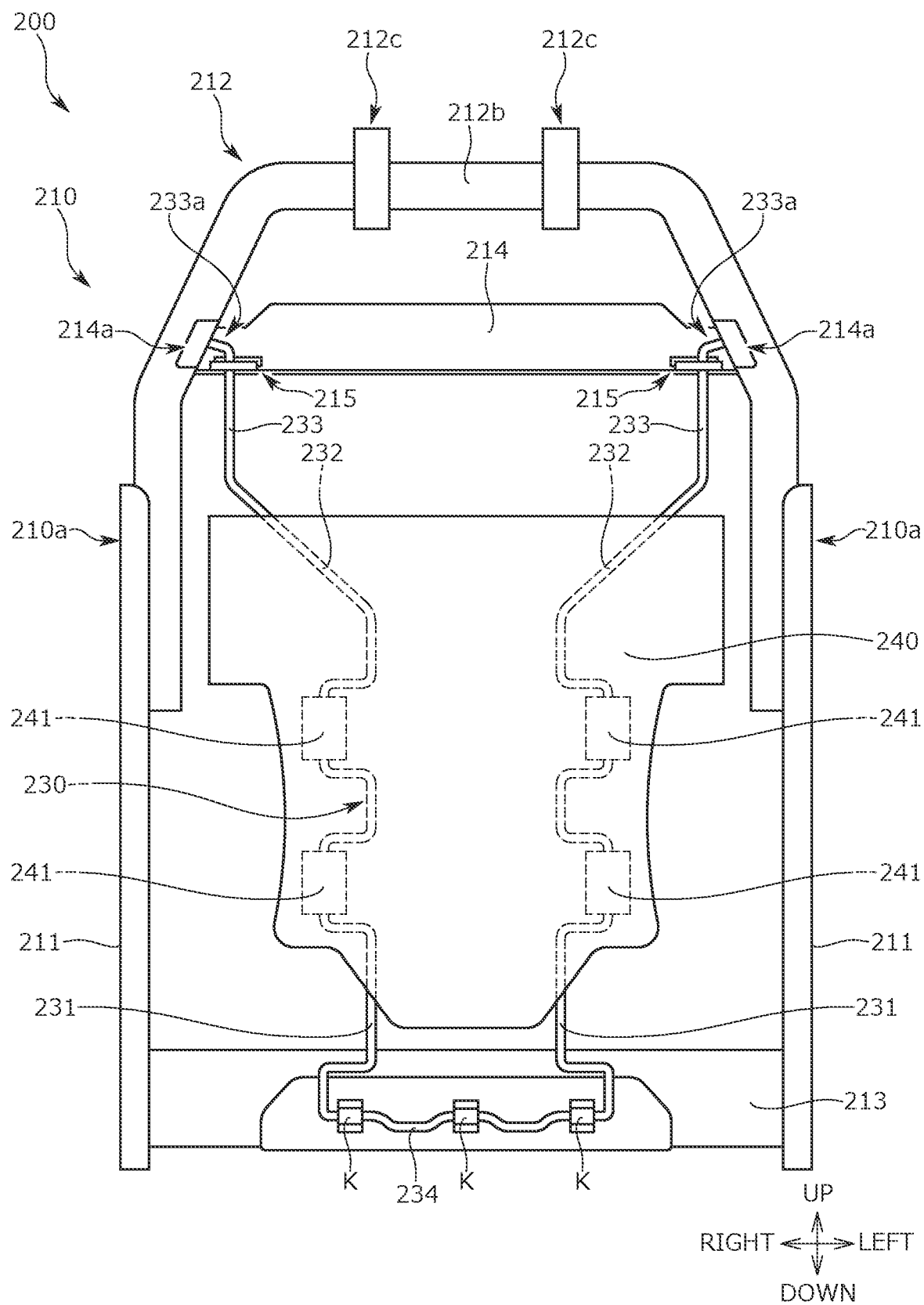
FIG. 15 is a perspective view of a seat frame according to a second modification example.

FIG. 15 is a perspective view of a seat frame 200 according to a second modification example. A wire member 230 is disposed between back side frames 210a disposed in the side portions of a seat back frame 210. An extending portion 231 of the wire member 230 is formed by repeated bending to the outside and inside in the seat width direction.

Engaging portions 241 disposed on the back surface of a pressure receiving member 240 are disposed between the bent extending portions 231 in the up to down direction. More specifically, the engaging portion 241 is disposed in the recessed portion of the extending portion 231 bent so as to be recessed outward in the seat width direction in the up to down direction. According to such a configuration, the position of the pressure receiving member 240 (position in the up to down direction) with respect to the extending portion 231 of the wire member 230 is regulated to be an appropriate position.

Third Modification Example

Figure 16:
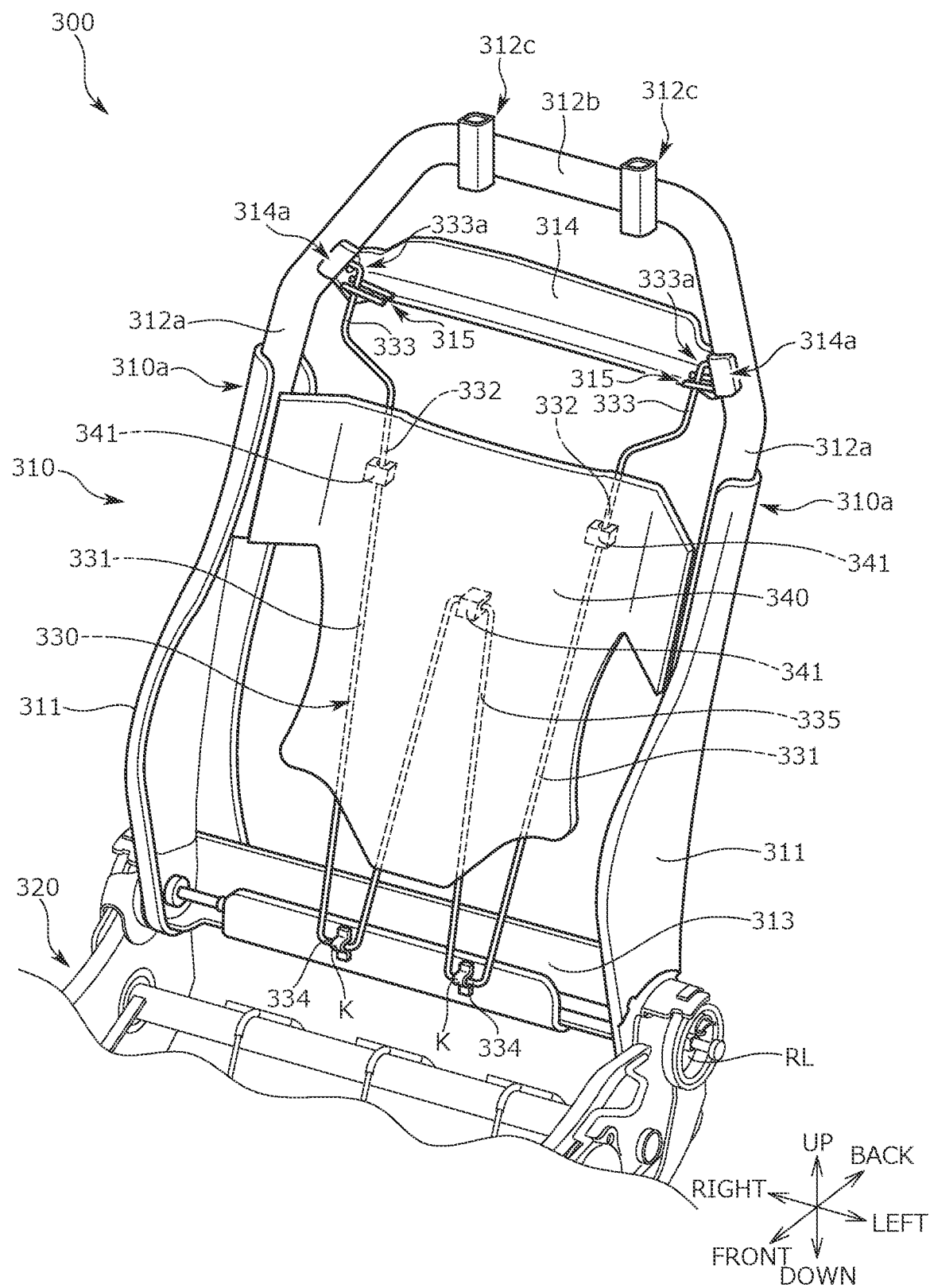
FIG. 16 is a front view of a seat frame according to a third modification example.

FIG. 16 is a front view of a seat frame 300 according to a third modification example. A wire member 330 is disposed between back side frames 310a disposed in The side portions of a seat back frame 310. The wire member 330 has a protruding portion 335 bent so as to protrude upward from lower connecting portions 334 between a pair of extending portions 331 separated from each other in the seat width direction.

The distance between the extending portions 331 of the wire member 330 disposed so as to be separated from each other in the seat width direction increases from a lower frame 313 on the lower side toward a cross-linking frame 314 on the upper side. In other words, the extending portions 331 are tapered so as to widen outward in the seat width direction.

The protruding portion 335 of the wire member 330 is formed in a tapered shape so as to decrease in width toward the upper side. In addition, the gap between the adjacent extending portion 331 and the protruding portion 335 widens toward the upper side. At this time, the position of an engaging portion 341 with respect to the protruding portion 335 is disposed below the position of the engaging portion 341 with respect to the extending portion 331. It should be noted that the upper and seat-width-direction outside parts of a pressure receiving member 340 are inclined toward the front.

Fourth Modification Example

Figure 17:
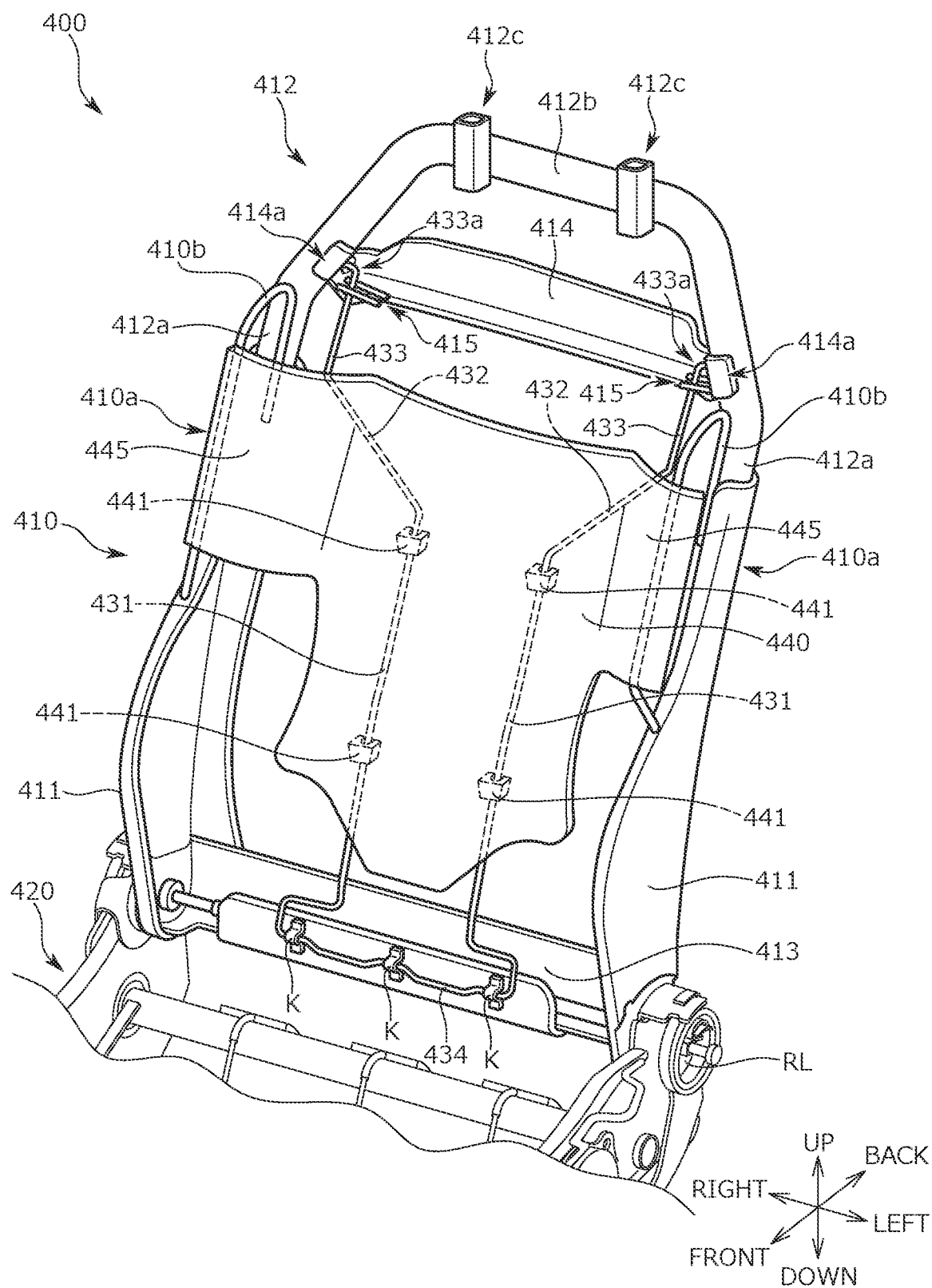
FIG. 17 is a front view of a seat frame according to a fourth modification example.
Figure 18:
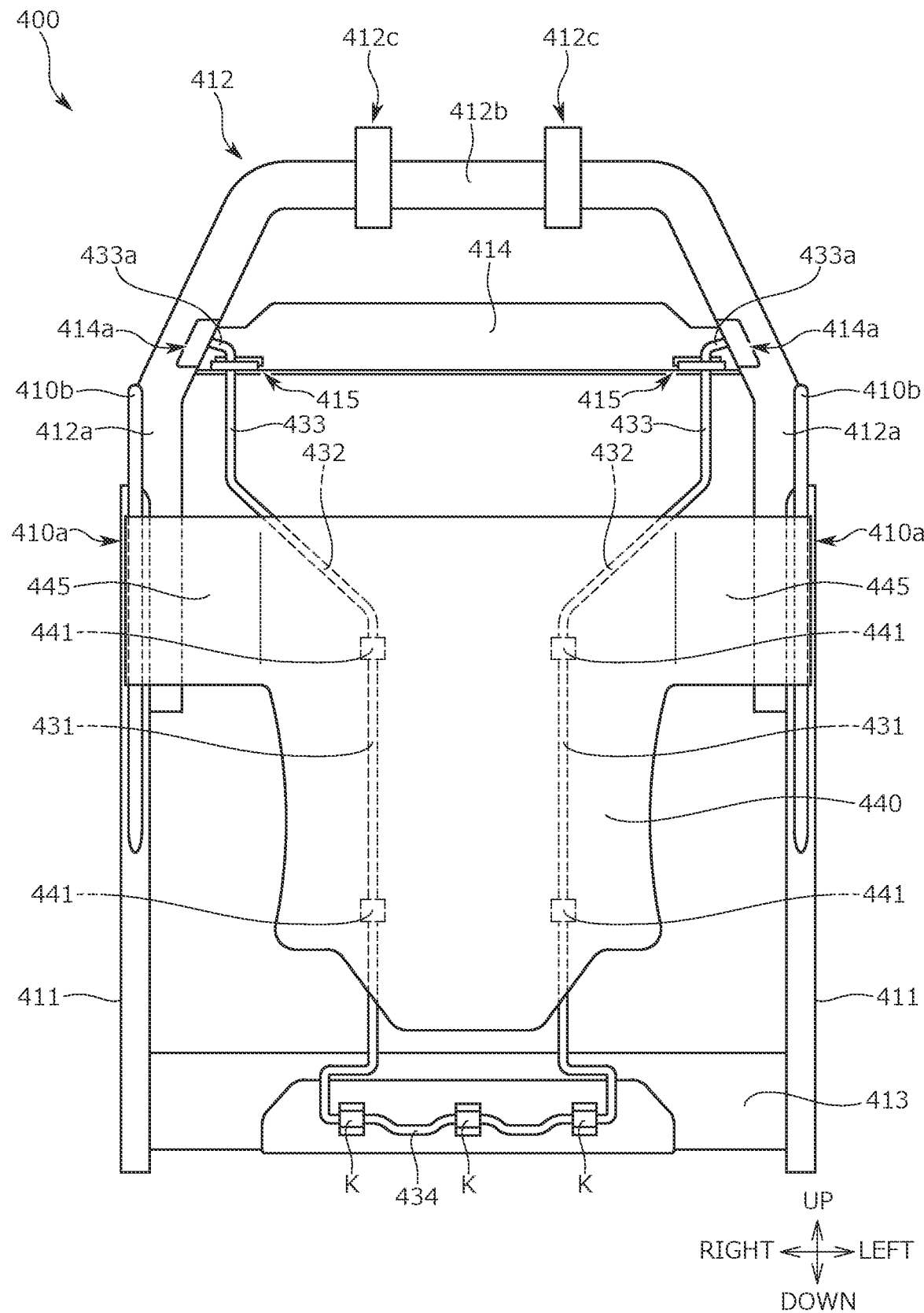
FIG. 18 is a perspective view of the seat frame according to the fourth modification example.

FIG. 17 is a front view of a seat frame 400 according to a fourth modification example, and FIG. 18 is a perspective view of the seat frame 400 according to the fourth modification example. A pressure receiving member 440 includes a middle part corresponding to a backrest portion and further includes side portion support portions 445 corresponding to an occupant's side portions. The side portion support portions 445 mainly support the rear parts of the side portions of the occupant's upper body part corresponding to the height of the chest.

The side portion support portions 445 are integrally formed as the pressure receiving member 440, extend diagonally forward to the outside in the right to left direction from the upper portions of the right and left ends of the middle part, more specifically, the part corresponding to the occupant's chest height, and extend to the front sides of back side frames 410a with predetermined gaps in the front to back direction from support wires 410b of the back side frames 410a. The support wire 410b is curved so as to protrude forward and supports the side portion support portion 445 from the back surface.

Other Modification Examples

In the above embodiment, the wire member 30 is engaged with the clip-shaped engaging portion 41 provided on the back surface 40a of the pressure receiving member 40. Alternatively, the wire member 30 may be fixed so as to enter a groove formed so as to extend in the up to down direction in the back surface 40a of the planar pressure receiving member 40.

In addition, in the above embodiment, the shape of the upper frame is inclined inward in the seat width direction from the pair of right and left upper side frames (upper frame side portions) to the upper connecting frame extending so as to interconnect the upper ends of The upper side frames. The upper frame may not be inclined inward in the seat width direction from the pair of right and left upper side frames to the upper connecting frame, and the upper side frame may be bent at a substantially right angle to form the upper connecting frame.

In addition, in the above embodiment, the cross-linking frame is attached to the upper side frame at a position above the region where the main side frame and the upper side frame overlap. The positions of the cross-linking frame and the wire receiving portion are not limited thereto and may be below the upper end of the main side frame and at the same height as the region where the main side frame and the upper side frame overlap.

The vehicle seat and the vehicle seat manufacturing method have been described above by exemplifying the wire member fastened to the seat back frame. The vehicle seat and the vehicle seat manufacturing method described above are not limited to the application to the seat back frame and are also applicable to the seat cushion frame.

In addition, although the wire member that connects the pressure receiving member to the seat back frame has been described as an example of the wire member, the pressure receiving member may not be attached insofar as the wire member is disposed between the pair of side frames.

REFERENCE SIGNS LLST

S: vehicle seat (conveyance seat)
S1: seat back
S2: seat cushion
S3: headrest
P: pad member
T: skin material
1: seat frame
10: seat back frame (seat frame)
   10a: back side frame (side frame)
11: main side frame
12: upper frame
   12a: upper side frame
   12b: upper connecting frame
   12c: pillar support portion
13: lower frame
14: cross-linking frame
   14a: end portion
15, 15X, 15Y, 15Z: wire receiving portion
   15a, 15Xa, 15Ya, 15Za: front part (first part)
   15b, 15Xb, 15Yb, 15Zb: rear part (second part)
16, 16Z: end portion receiving portion
20: seat cushion frame
RL: reclining mechanism
   30: wire member
   31: extending portion
   32: inclined portion
   33: upper connecting portion
      33a: wire end portion
   34: lower connecting portion 40: pressure receiving member
40a: back surface
   41: engaging portion
   41a: inclined portion
   41b: recessed portion
K: fixing member
ARM: working arm
100, 200, 300, 400: seat frame
110, 210, 310, 410: seat hack frame (seat frame)
   110a, 210a, 310a, 410a: back side frame (side frame)
   410b: support wire
111, 211, 311, 411: main side frame
112, 212, 312, 412: upper frame
   112a, 212a, 312a, 412a: upper side frame
   112b, 212b, 312b, 412b: upper connecting frame
   112c, 212c, 312c, 412c: pillar support portion
113, 213, 313, 413: lower frame
114, 214, 314, 414: cross-linking frame
120, 320, 420: seat cushion frame
130, 230, 330, 430: wire member
   131, 231, 331, 431: extending portion
   132, 232, 332, 432: inclined portion
   133, 233, 333, 433: upper connecting portion
   133a, 233a, 333a, 433a: wire end portion
   134, 234, 334, 434: lower connecting portion
140, 240, 340, 440: pressure receiving member
   141, 241, 341, 441: engaging portion

The invention claimed is:

1. A conveyance seat comprising a seat frame, wherein the seat frame includes:
a pair of side frames arranged in side portions of the conveyance seat; and
a cross-linking frame cross-linking the pair of side frames,
a wire member is disposed between the pair of side frames,
the cross-linking frame has a wire receiving portion receiving the wire member,
the wire receiving portion is a recessed portion recessed from an inside toward an outside in a width direction of the conveyance seat,
the wire member is urged toward the outside in the width direction of the conveyance seat and fastened to the recessed portion of the wire receiving portion in the width direction of the conveyance seat, and
the cross-linking frame further includes an end portion receiving portion receiving an end portion of the wire member, wherein the end portion receiving portion is a separate portion from the wire receiving portion.

2. The conveyance seat according to claim 1, wherein the end portion of the wire member in the width direction of the conveyance seat is bent outward and is inserted through the end portion receiving portion.

3. The conveyance seat according to claim 1, wherein the wire receiving portion has a first part close to an occupant support surface and a second part far from the occupant support surface, and
the first part is formed shorter than the second part in the width direction of the conveyance seat.

4. The conveyance seat according to claim 1, wherein the wire receiving portion is formed so as to be curved in a direction toward an occupant support surface.

5. The conveyance seat according to claim 1, wherein a planar pressure receiving member is attached to the wire member.

6. The conveyance seat according to claim 5, wherein the wire member is disposed so as to be separated in the width direction of the conveyance seat, and
a distance between the wire members disposed so as to be separated in the width direction of the conveyance seat increases toward the cross-linking frame.

7. The conveyance seat according to claim 6, wherein the pressure receiving member is provided with an engaging portion for fixing to the wire member on a side opposite to an occupant support surface, and
the engaging portion is provided with an inclined portion inclined outward in the width direction of the conveyance seat.

8. A method for manufacturing a conveyance seat, comprising:
a step of preparing a wire member;
a step of preparing a seat frame having a pair of side frames arranged in side portions of the conveyance seat and a cross-linking frame cross-linking the pair of side frames, wherein the cross-linking frame has a wire receiving portion receiving the wire member, wherein the wire receiving portion is a recessed portion recessed from an inside toward an outside in a width direction of the conveyance seat, wherein the cross-linking frame further includes an end portion receiving portion receiving an end portion of the wire member, wherein the end portion receiving portion is a separate portion from the wire receiving portion;
a step of fastening the wire member that is urged toward the outside in the width direction of the conveyance seat to the recessed portion of the wire receiving portion of the cross-linking frame;
a step of inserting the end portion of the wire member through the end portion receiving portion; and
a step of attaching a skin material and a pad member to the seat frame.

9. The conveyance seat manufacturing method according to claim 8, wherein the step of fastening the wire member includes moving the wire member from the inside to the outside in the width direction of the conveyance seat to fasten the wire member to the wire receiving portion.

* * * * *